(12) United States Patent
Tyler et al.

(10) Patent No.: US 8,913,948 B2
(45) Date of Patent: Dec. 16, 2014

(54) CONNECTOR FOR PRINTER ACCESSORY

(71) Applicant: Hewlett-Packard Development Company, L.P., Houston, TX (US)

(72) Inventors: Jerrod Houston Tyler, Vancouver, WA (US); Kevin Lo, Vancouver, WA (US); Jeffrey Castleberry, Underwood, WA (US); Alvaro Pardo, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/770,475

(22) Filed: Feb. 19, 2013

(65) Prior Publication Data
US 2014/0233045 A1 Aug. 21, 2014

(51) Int. Cl.
*H01R 13/44* (2006.01)
*G06K 15/00* (2006.01)

(52) U.S. Cl.
CPC ................... *G06K 15/4025* (2013.01)
USPC ............................ 399/393; 439/135; 439/136

(58) Field of Classification Search
CPC .................................................. G06K 15/4025
See application file for complete search history.

(56) References Cited

U.S. PATENT DOCUMENTS

| 5,863,498 | A | * | 1/1999 | Houston | .................. 422/28 |
|---|---|---|---|---|---|
| 5,940,116 | A | | 8/1999 | Park et al. | |
| 6,592,387 | B2 | | 7/2003 | Komenda et al. | |
| 6,817,699 | B2 | | 11/2004 | Hirashima et al. | |
| 7,272,336 | B1 | | 9/2007 | Dawson et al. | |
| 7,500,862 | B1 | | 3/2009 | Herring et al. | |
| 7,567,356 | B2 | | 7/2009 | Endo | |

FOREIGN PATENT DOCUMENTS

JP 2006062177 3/2006

OTHER PUBLICATIONS

Machine translation of JP Pub 2006062177 (Pub. date Mar. 3, 2006) to Okamoto Tomoyuki.*
CISCO, Installing the Cisco UCS 61oo Series Fabric Interconnect, Hewlett-Packard, downloaded from Internet Dec. 2012, 17 pages.

* cited by examiner

*Primary Examiner* — Eric A Rust
*Assistant Examiner* — Haris Sabah

(57) ABSTRACT

A printer accessory including a housing and a connector, the connector having a frame defining an opening in the housing, and including a contact housing and a door slideably disposed within the opening. Biasing elements bias the contact housing and door to extend from the opening, wherein the door is configured to be depressed into the housing through the opening to expose electrical contacts on the contact housing.

20 Claims, 13 Drawing Sheets

CONNECTOR FOR PRINTER ACCESSORY

BACKGROUND

Image forming devices, such as printers, generally include an output paper tray, a manual paper tray (e.g. a fold-out tray for special media types and/or sizes), and a main paper tray or drawer for holding sheets of print media. Some printers are configured to enable accessories to be later added that can add to or enhance functionality of the printer, such as accessory trays than can increase media storage capacities and/or to accommodate different sizes and types of print media as compared to the main paper tray of the printer.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
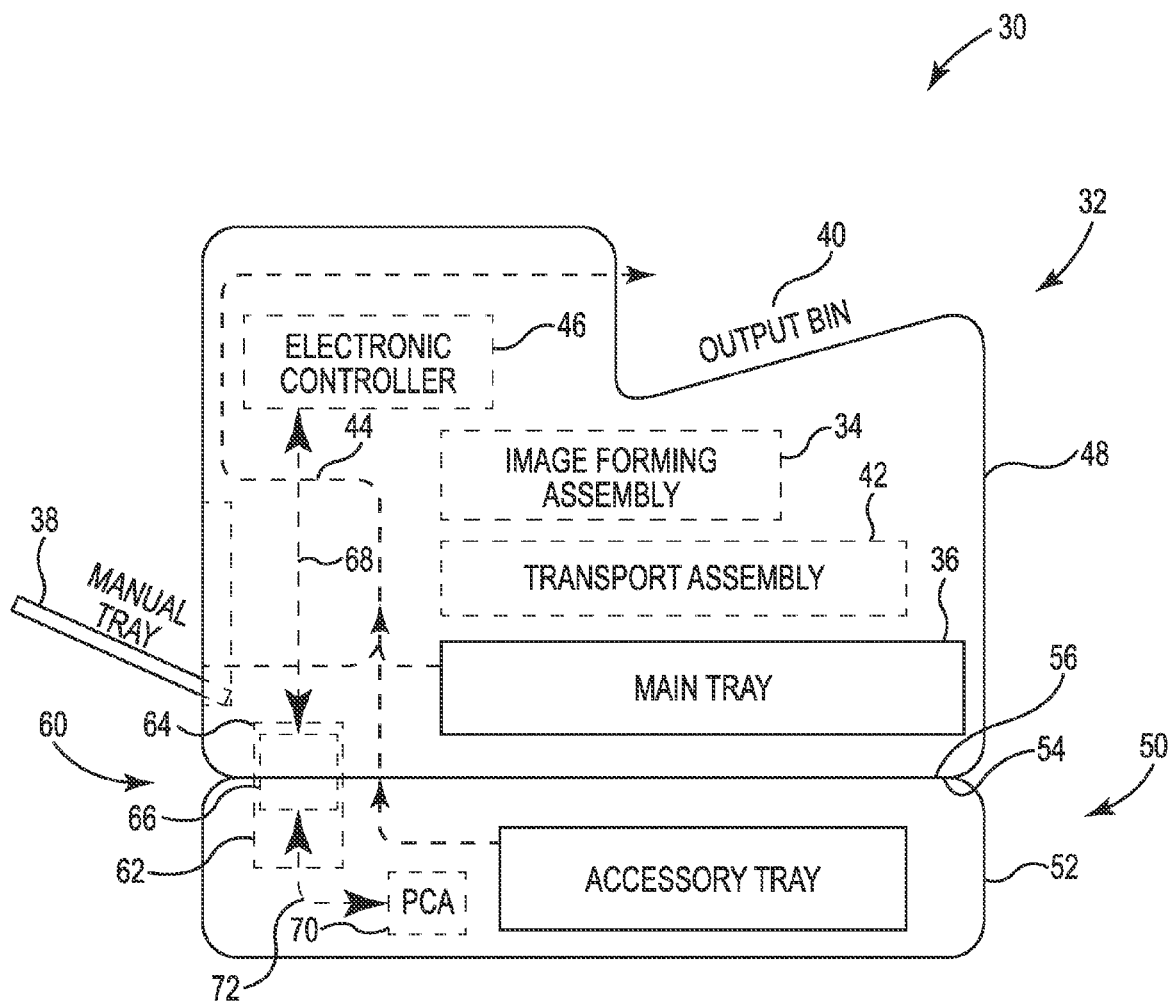
FIG. 1 is a block and schematic diagram illustrating an example of a printing system.

FIG. 1 is a block and schematic diagram generally illustrating a printing system 30 according to one example. Printing system 30 includes a printer 32 having an image forming assembly 34, a main tray 36, a manual tray 38, an output bin 40, a transport assembly 42 transporting media along a media transport path 44, and an electronic controller 46 housed in a printer housing 48. Main tray 36 holds sheets of print media, such as paper, which is fed from main tray 36 and transported along transport path 44 by transport assembly 42. Print media, such as card stock, envelopes, labels, and other suitable media can also be stored in main tray 36. Print media, including types and sizes of print media that might otherwise be able to be accommodated by main tray 36, can also be fed from manual tray 38 and transported along transport path 44 by transport assembly 42.

Printing system 30 further includes an accessory tray 50 having a housing 52. Accessory tray 50 may increase the print media storage capacity of printing system 30 (i.e., increase the input capacity) and/or accommodate different sizes and types of media which might not be able to be accommodated by main tray 36. An electrical connector system 60, which will be described in greater detail below, electrically connects electrical components of accessory tray 50 (e.g., motors, sensors, printed circuit assemblies (PCAs)) to printer 32.

Electronic controller 46 communicates with image forming assembly 34, main and manual trays 36, 36, and transport assembly 42. Electronic controller 46 can receive data from a device via any suitable data communication path (e.g., electronic, Bluetooth, WiFi, optical), and includes a memory for storing such data. The received data represents, for example, a document and/or image data to be printed and, as such, forms a print job for printing system 30 and includes one or more print job commands and/or command parameters.

Electronic controller 46 controls image forming assembly 34 to form images on sheets of media transported thereto along transport path 44 by transport assembly 42 from an input source, such as main tray 36 and manual tray 38. The printed sheet of media is transported from image forming assembly 34 to output bin 40. In one example, electronic controller 46 controls image forming apparatus to form characters, symbols, and/or other graphics or images on sheets of print media. In one example, logic and drive circuitry forming a portion of electronic controller 46 is located on image forming assembly 34. In another example, logic and drive circuitry forming a portion of electronic controller 46 is located off image forming assembly 34

In one example, image forming assembly 34 includes a laser imaging unit which prints images on print media using a laser imaging process. In one example, image forming assembly 34 includes an inkjet printhead which prints images on print media by ejecting drops of ink from a plurality of orifices or nozzles, typically arranged in one or more columns or arrays, onto the print media. In one example, the inkjet printhead is a scanning type printhead which employs a single printhead die that is scanned across a scan axis relative to a sheet of print medium while a controlled sequence of individual drops of ink are ejected from the nozzles to collectively form a band or "swath" of an image, such as a character, symbol, or other graphic, on the print medium.

In one example, the inkjet printhead is a wide array printhead which employs a plurality of stationary printhead dies mounted on a support or bar, the plurality of stationary dies being arranged relative to one another so as to span a page of print medium. Such a printhead is sometimes referred to a print bar. Each of the plurality of the printhead dies is controlled to eject individual drops of ink from the nozzles, with the drops of ink from the plurality of stationary printhead dies together forming a print band or swath of an image on the print medium. The print medium is incrementally advanced after each band or swatch of the image is printed so that the image is incrementally printed.

According to one example, an accessory, such as accessory tray 50, having a housing 52, can later be added to printer 32, for example, to increase media storage capacities (thereby increasing input capacity) and/or to accommodate different sizes and types of print media. Such accessories, including accessory tray 50, require electrical interconnects with the printer, such as printer 32, to power and communicate with motors, sensors, and printed circuit assemblies (PCAs), including application specific integrated circuits (ASICs) within the accessory tray.

According to one example, an electrical connector system 60 for electrically connecting printer 32 to accessory tray 50 includes a connector 62 disposed on a top surface 56 of accessory tray 50, and a receptacle 64 disposed on a bottom surface 54 of printer 32. According to one example, connector 62 includes a contact housing 66 which is configured to extend into and be received by receptacle 64 to make electrical connection therewith. According to one example, receptacle 64 is electrically connected to electronic controller 46 (and other electrical components within printer 32) as indicated at 68, and contact housing 66 of connector 62 is electrically connected to electrical components within accessory tray 50, such as PCA 70, as indicated at 72.

Figure 2A:
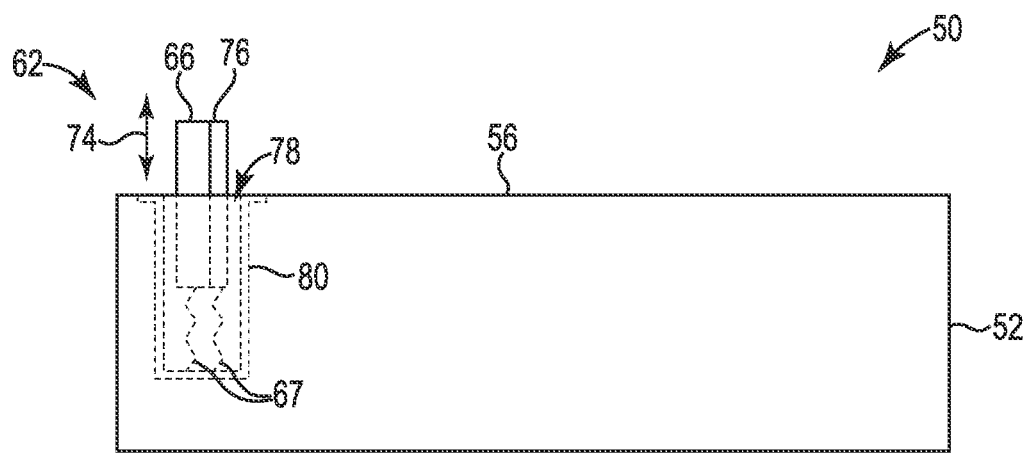
FIG. 2A is a block and schematic diagram illustrating a connector for an accessory tray, according to one example.
Figure 2B:
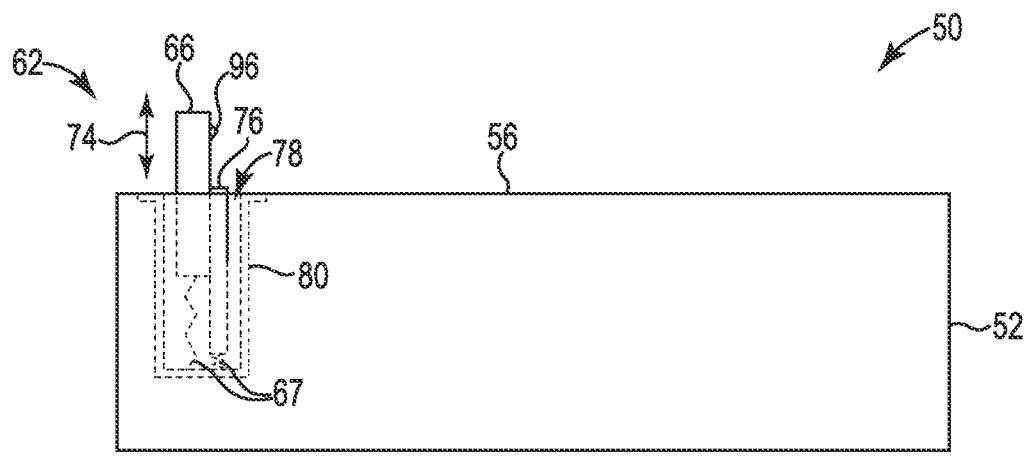
FIG. 2B is a block and schematic diagram illustrating a connector for an accessory tray, according to one example.
Figure 2C:
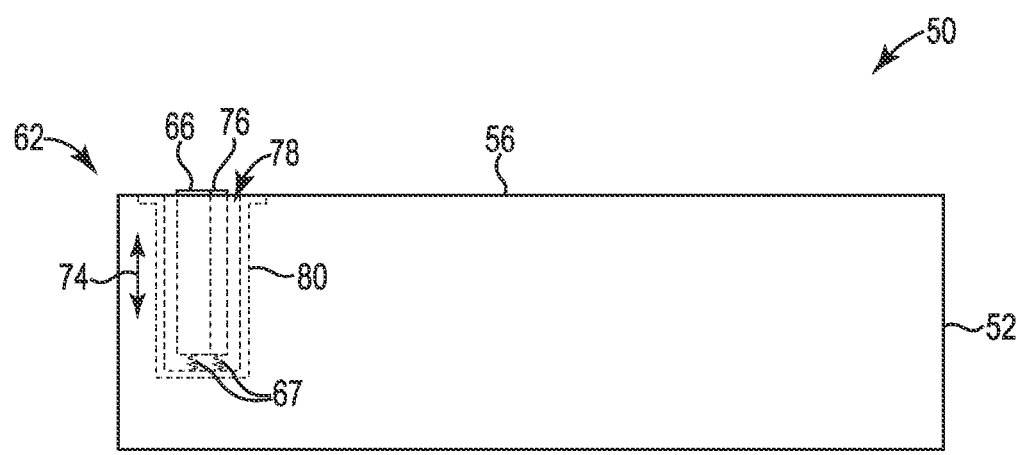
FIG. 2C is a block and schematic diagram illustrating a connector for an accessory tray, according to one example.

FIGS. 2A through 2C are block and schematic diagrams which generally illustrate connector 62 of a printer accessory, such as accessory tray 50, according to one example. In addition to contact housing 66, connector 62 includes a door 76, wherein both contact housing 66 and door 76 are slideably disposed within an opening 78 defined in top surface 56 of housing 52 of accessory tray 50 by a connector frame 80. Contact housing 66 and door 76 are moveable within opening 78 is vertical directions relative to top surface 56 of accessory tray 50, as indicated by directional arrows 74, with biasing elements 67 (e.g. resilient elements) configured to bias contact housing 66 and door 76 so as to extend together from opening 78, as illustrated by FIG. 2A. Door 76 is configured to be depressed into housing 52 through opening 78 to expose electrical contacts 96 on contact housing 66, as illustrated by FIG. 2B.

According to one example, such as illustrated by FIG. 1, accessory tray 50 is configured to be mated with printer 32 by placing printer 32 on top of accessory tray 50. Prior to placing printer 32 on top of accessory tray 50, contact housing 66 and door 76 are biased to extend from opening 78, with door 76 covering electrical contacts 96, as illustrated by FIG. 21. When placing printer 32 on top of accessory tray 50, if receptacle 64 of printer 32 is aligned with contact housing 66 of connector 62 of accessory tray 50, door 76 is depressed into housing 52 by printer 32 to expose electrical contacts 96 (as illustrated by FIG. 2A), and contact housing 66 extends into and is received by receptacle 64 to make an electrical connection therewith and, thus, to printer 32, as illustrated by FIG. 2B. When placing printer 32 on top of accessory tray 50, if receptacle 64 of printer 32 is misaligned with contact housing 66 of connector 62, connector housing 66 and door 76 are together depressed into housing 52 of accessory tray 50, as illustrated by FIG. 2C, and no electrical connection is made between accessory tray 50 and printer 32.

By keeping electrical contacts 96 covered by door 76 and depressing contact housing 66 and door 76 together into housing 52 of accessory tray 50 when receptacle 64 of printer 32 is misaligned with contact housing 66 when mating printer 32 with accessory tray 50, potential damage is prevented to electrical contacts 96 as well as to receptacle 64 and contact housing 66, and potentially to other components of printer 32 and accessory tray 50. Additionally, by keeping electrical contacts 96 covered by door 76 both when accessory tray is in an unmated position (i.e. separate from printer 32) and during the mating process with printer 32, electrical contacts 96 are preventing from contacting potential sources of electrostatic discharge that might otherwise discharge into and damage internal electrical components upon contact with electrical contacts 96.

Figure 3:
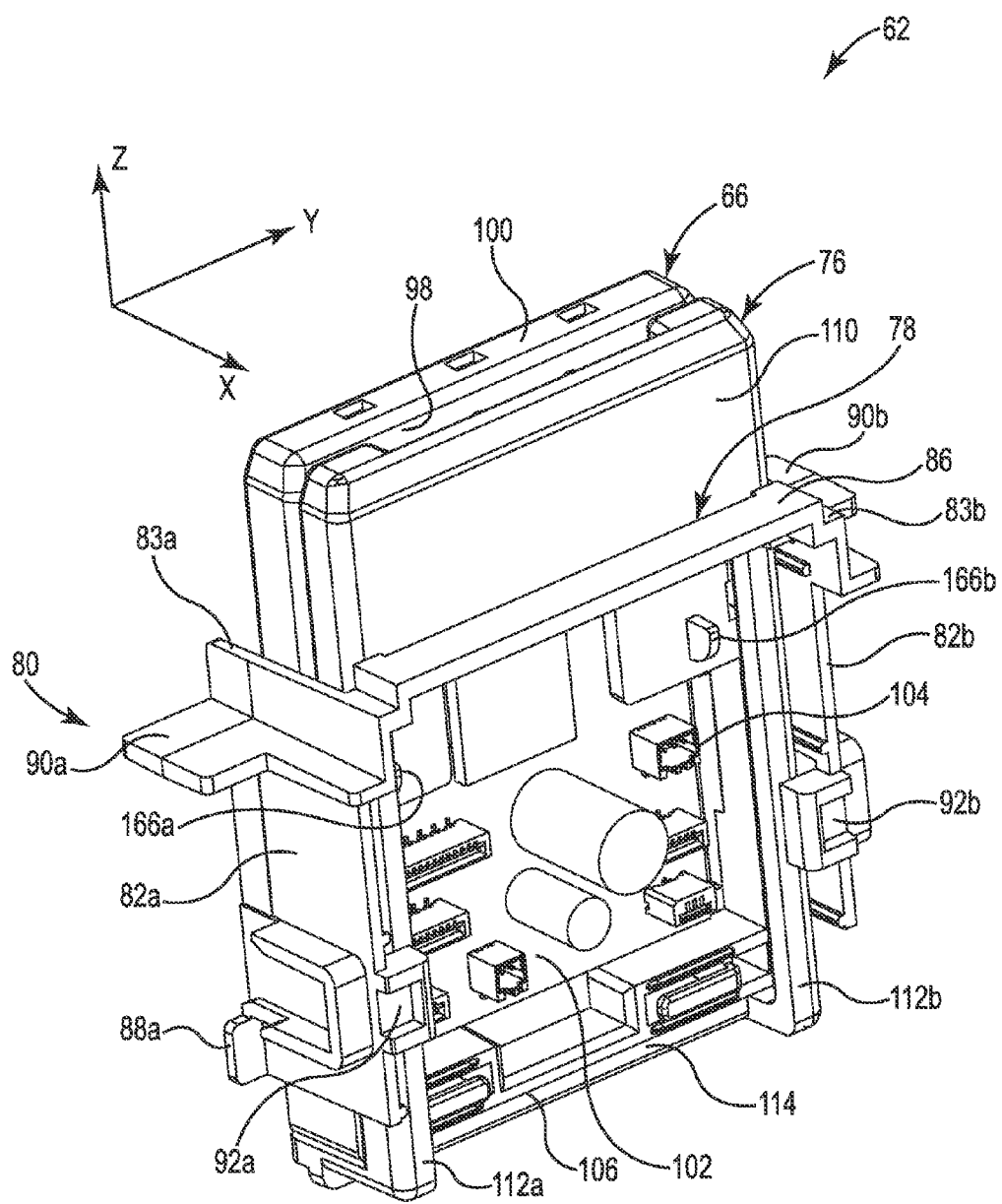
FIG. 3 is a perspective view illustrating a connector for an accessory tray, according to one example.

FIG. 3 is a perspective view illustrating a front side of connector 62 according to one example. Contact housing 66 and door 76 are slideably disposed within opening 78 in a top of connector frame 80. Connector frame 80 includes a pair of vertically extending opposing edge walls 82a, 82b, a side wall 84 extending laterally between edge walls 82a, 82b along a rear side of connector frame 80 (see FIG. 4 below), and a crossbar 86 extending between top edges 83a, 83b of edge walls 82a, 82b along a front side of connector frame 80. Together, edge walls 82a, 82b, side wall 84, having a top edge 85, and cross-member 86 define opening 78 into which contact housing 66 and door 76 are slideably positioned.

Connector frame 80 further includes a pair of stabilizer tabs 88a, 88b (see FIG. 4) extending orthogonally from edge walls 82a, 82b proximate to a lower edges 89a, 89b. Additionally, a pair of support flanges 90a, 90b extend orthogonally from edge walls 82a, 82b proximate to upper edges 83a, 83b, with support flanges 90a, 90b being substantially parallel to top surface 56 of accessory tray housing 52. A pair of retention or guide tabs 92a, 92b extend toward one another from opposing edge walls 82a, 82b.

Contact housing 66 includes a plurality of electrical contacts 96 (not visible in FIG. 3; see FIG. 5) extending from a major surface 98 facing door 76 proximate to a top edge 100. Contact housing further includes a printed circuit assembly (PCA) 102 disposed on major surface 98 and extending from below electrical contacts 96 to a bottom edge 108, with PCA 102 including a plurality of electrical connectors, such as electrical connector 104, for receiving electrical connections from electrical devices within accessory tray 50 (e.g., motors, sensors, ASICs).

Door 76 includes a portion forming a contact cover 110, a pair of arms 112a, 112bb extending vertically downward from contact cover 110, and an interlock cross-member 114 extending between the ends of arms 112a, 112b, and disposed below bottom edge 108 of contact housing 66.

Figure 4:
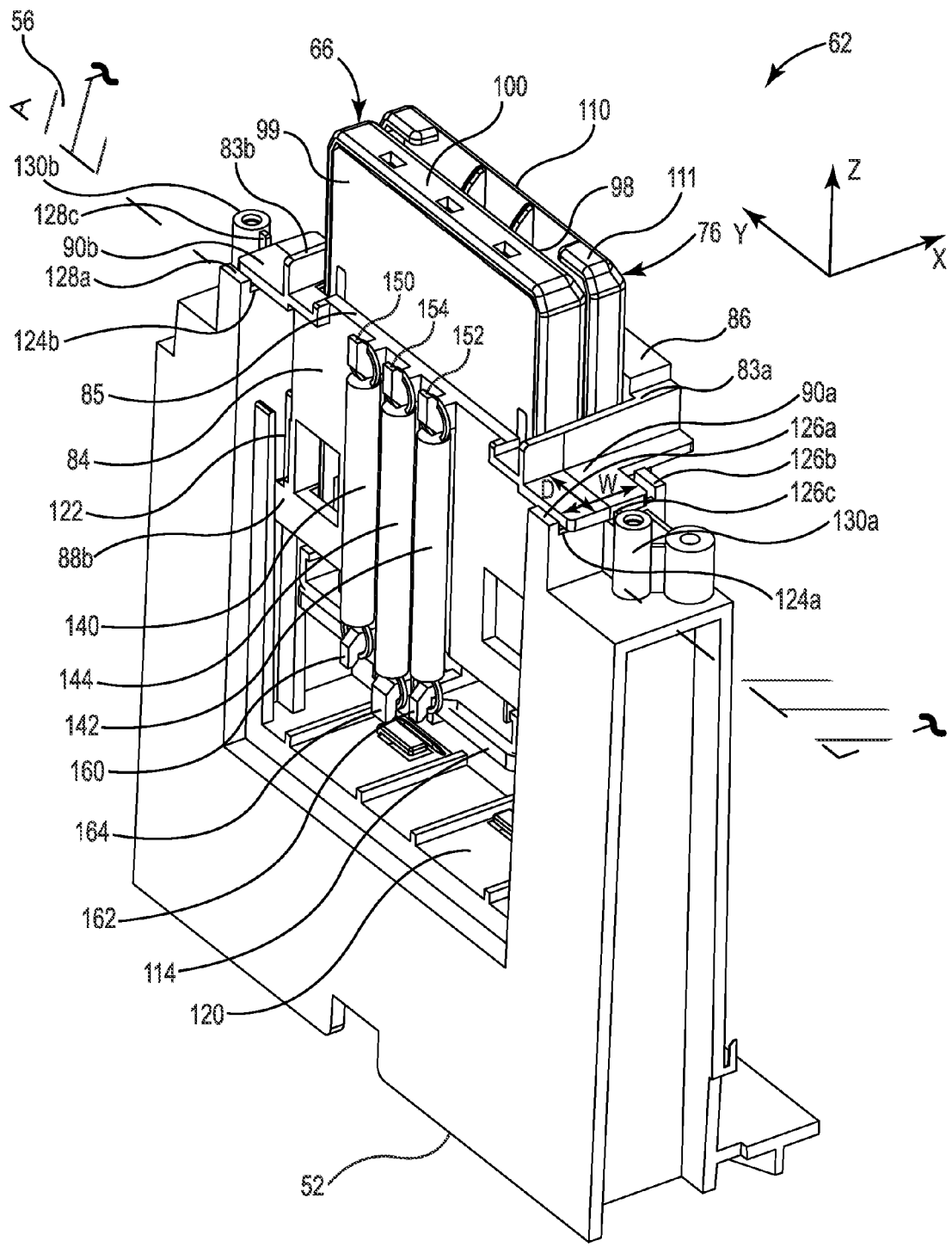
FIG. 4 is a perspective view illustrating the connector for an accessory tray depicted in FIG. 3, according to one example.

FIG. 4 is a perspective view of a rear side of connector 62, according to one example, and illustrates connector 62 in an installed position within a base cavity 120 formed within a portion of housing 52 of accessory tray 50. Cavity 120 includes a channel 122 on each side of base cavity 120 (only one channel is visible in FIG. 4) which are configured to receive stabilizer tabs 88a, 88b and guide connector frame 80 and, thus, connector 62 into base cavity 120. Placement of stabilizer tabs 88a, 88b into channels 122 rotational movement of connector 62 about a y-axis (as illustrated by FIG. 4).

Housing 52 includes a pair of ledges 124a, 124b disposed on opposite edges of base cavity 120 and providing a surface on which support flanges 90a, 90b of connector frame 80 respectively rest. Ledges 124a, 124b are respectively bounded on three sides by vertical retaining elements 126a-126c and 128a-128c (only 128a and 128c are visible in FIG. 4). According to one example, a cover of housing 52 forming the top surface 56 thereof is secured by screws to screw receptacles 130a, 130b and thereby retains connector frame 80 within base cavity 120 and prevent movement of connector frame 80 in the z-direction.

According to one example, as illustrated, vertical retaining elements 126a, 126b and 128a, 128 are spaced apart by a distance greater than a width, W, of support flanges 90a, 90b, and vertical retaining elements 126c and 128c are respectively spaced from edge walls 82a, 82b by a distance greater than a depth, D, of support flanges 90a, 90b such that connector frame 80 and, thus, contact housing 66 and door 77 can move small distances along the x- and y-axes and rotate slightly about the z-axis (as shown in FIG. 4). As will be described in greater detail below, such movement enables contact housing 66 and door 77 to align with and engage receptacle 64 of printer 32.

Contact housing 66 and door 77 are moveable within opening 78 and, thus, within base cavity 120, but are biased by biasing elements 67, such as springs 140, 142, and 144 in the illustrated example, so as to be biased to an extended position from opening 78, as illustrated in FIGS. 2 and 3. According to one example, as illustrated, hook elements 150, 152, and 154 extend from a rear surface of side wall 84 of connector frame 80. Hooks 160 and 162 extend from a major surface 99 of contact housing 66 opposite major surface 98 and PCA 102, and a hook 164 extends from interlock cross-member 114 of door 77. Springs 140 and 142 respective extend between hooks 150, 160 and hooks 152, 162 and bias contact housing 66 upwardly in the z-direction so as to extend from opening 78 in connector frame 80. Similarly, spring 144 extends between hooks 154 and 164 and bias door 77 upwardly in the z-direction so as to extend from opening 78 in connector frame 80. With reference to FIG. 3, a pair of retainer tabs 166a, 166b extend from a front surface of contact housing 66 and limit the upward movement (in the z-direction) of contact housing 66 and door 77 by the biasing of springs 140, 142, 144.

Figure 5:
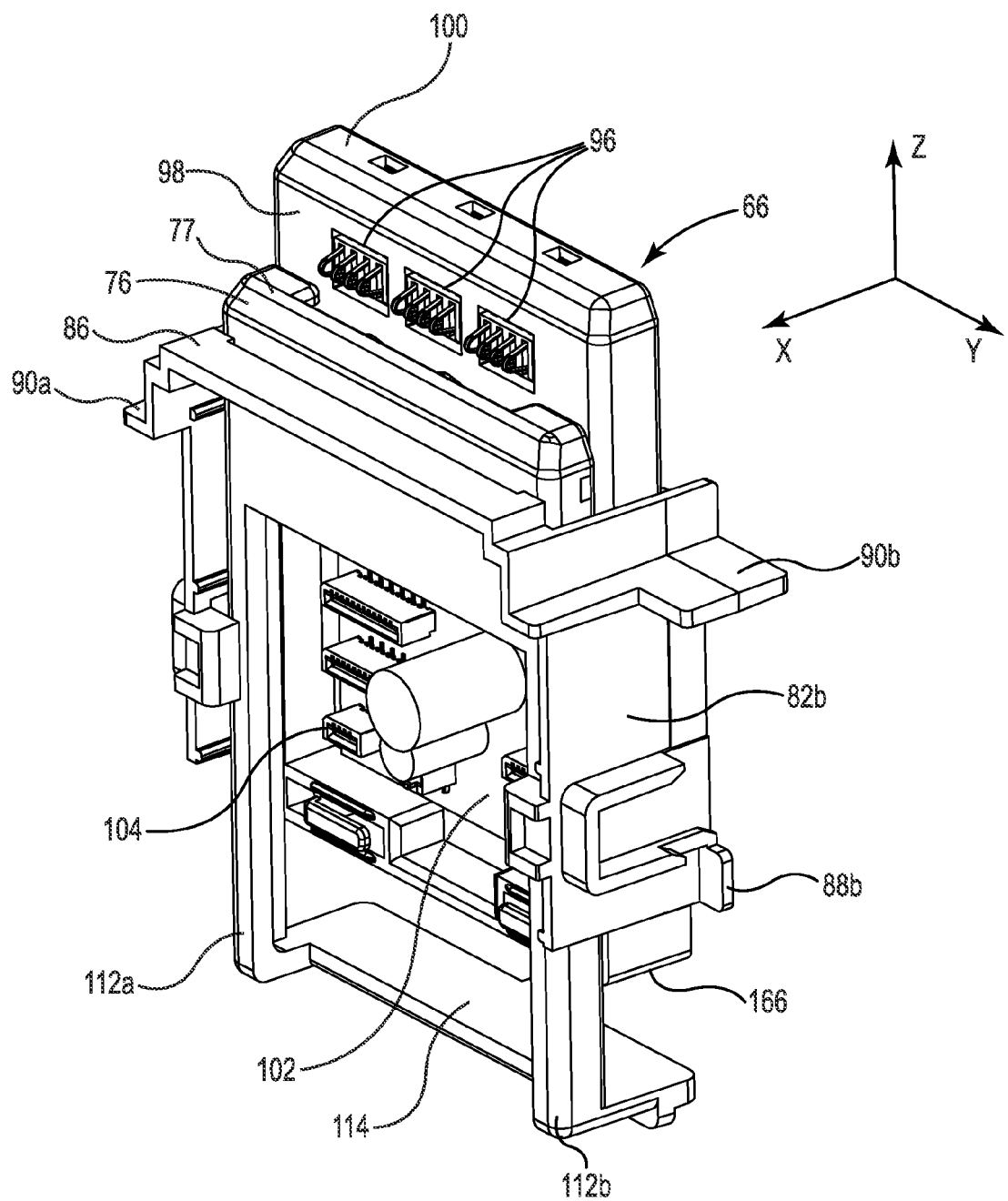
FIG. 5 is a perspective view illustrating the connector for an accessory tray depicted in FIG. 3, according to one example.

FIG. 5 is a perspective view of a front side of connector 62, according to one example, and illustrates door 76 is a depressed position such that door 76 is pushed or depressed into opening 78 of connector frame 80, such as from a force being applied to top edge 77. With door 76 in the depressed position, electrical contacts 96 on major surface 98 of contact housing 66 are exposed such that electrical contacts 96 can make an electrical connection with contact pads of receptacle 64 of printer 32.

Figure 6:
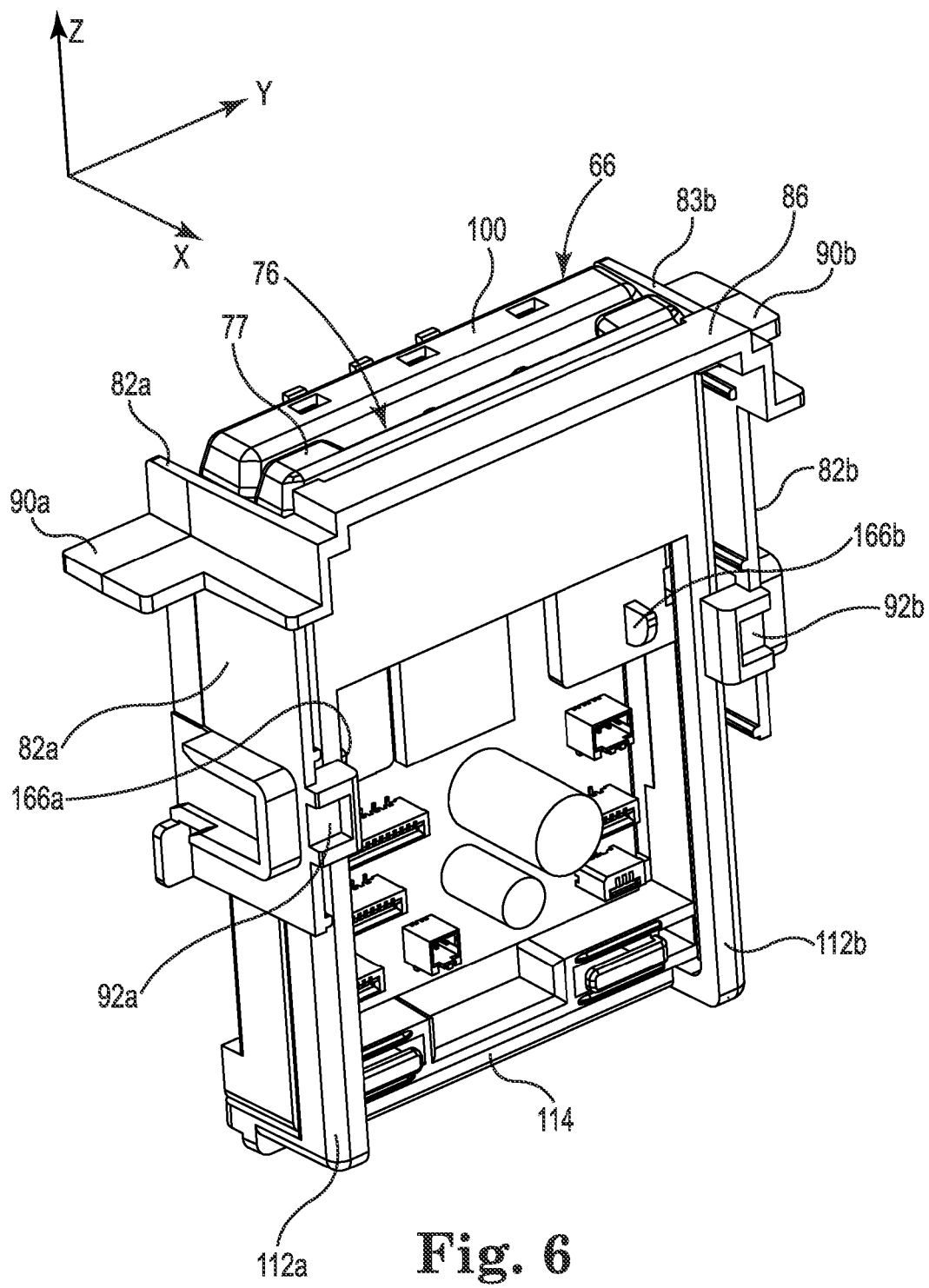
FIG. 6 is a perspective view illustrating the connector for an accessory tray depicted in FIG. 3, according to one example.

FIG. 6 is a perspective view of a front side of connector 62, according to one example, and illustrates both contact housing 66 and door 76 in depressed positions, such that both contact housing 66 and door 76 are pushed into opening 78 and, thus, into base cavity 120 (see FIG. 4). Such a position results from forces being simultaneously applied to top edge 100 of contact housing 66 and to top edge 111 of door 76, or from a force being applied only to top edge 100 of contact housing 66 with door 76 being forced down through interaction of contact housing 66 with door 76 via interlock cross-member 114.

By covering electrical contacts 96 with door 76, and interlocking movement of door 76 with that of contact housing 66, electrical contacts 96 are protected both from physical damage and from potentially damaging ESD at all times, until contact housing 66 is properly installed within receptacle 64.

Figure 7:
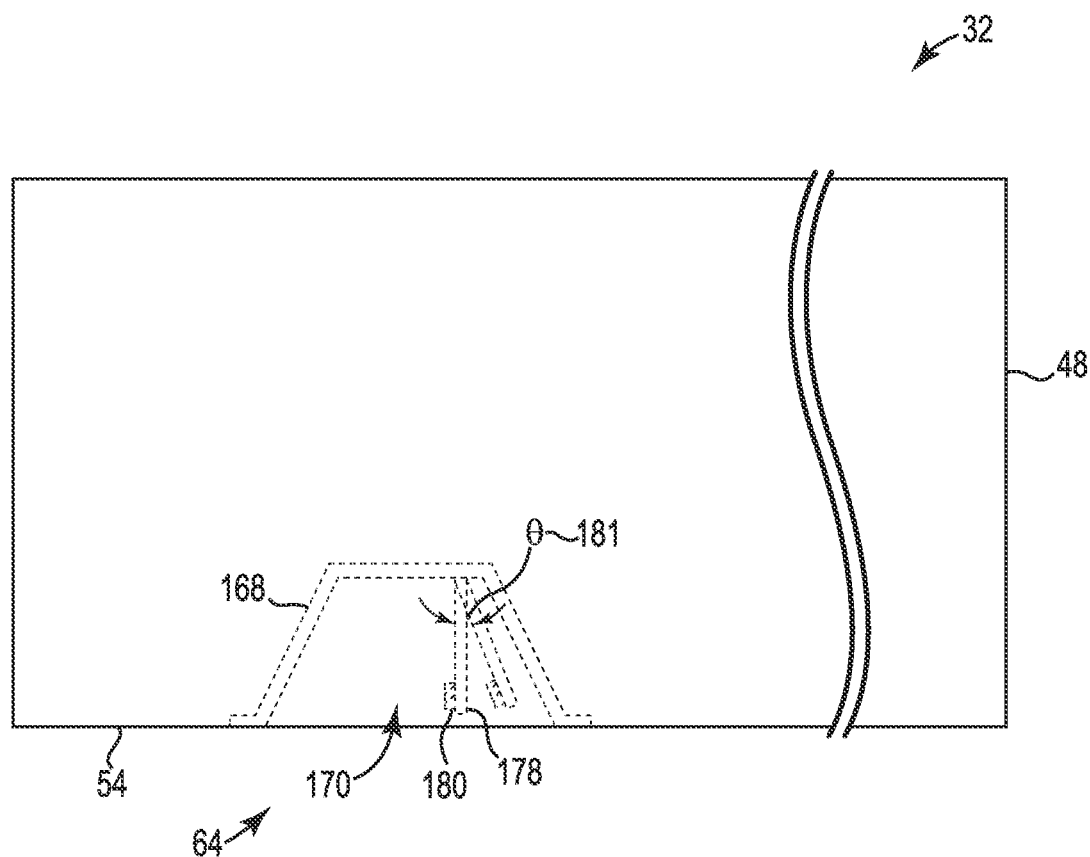
FIG. 7 is a block and schematic diagram illustrating a receptacle of a printer for connecting to an accessory tray, according to one example.

FIG. 7 is a block and schematic diagram which generally illustrates receptacle 64 of printer 32, according to one example. Receptacle 64 includes a base 168 defining an opening 170 in bottom surface 54 of housing 48 of printer 32. Receptacle 64 includes a plurality of contact pads 180 positioned adjacent to opening 170, such as on a PCA 178, so as to be substantially orthogonal to bottom surface 54. According to one example, contact pads 180, such as via PCA 178, are configured to rotate from orthogonal (as illustrated by angle θ at 181) so as to rotate away from corresponding electrical contacts (such as electrical contacts 96 of contact housing 66) as the corresponding electrical contacts are received into opening 170 and slide along and push against contact pads 180. According to one example, contact pads 180 can rotate from orthogonal by an angle θ 181 up to 3-degrees. By rotating from orthogonal away from the corresponding electrical contacts (such as electrical contacts 96 of contact housing 66), normal forces between contact pads 180 and the corresponding electrical contacts are reduced.

Figure 8:
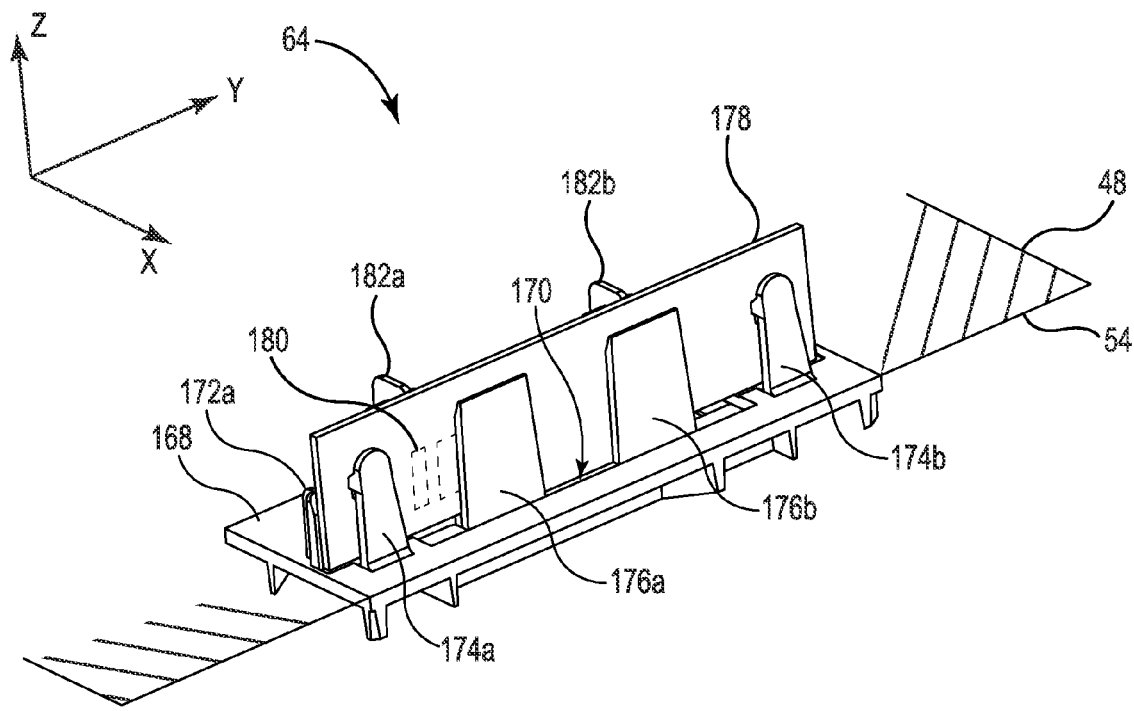
FIG. 8 is a perspective view illustrating a receptacle of a printer for connecting to an accessory tray, according to one example.

FIG. 8 is a perspective view of receptacle 64, according to one example. Receptacle 64 includes a base 168 defining an opening 170 in bottom surface 54 of housing 48 of printer 32 (see FIG. 7) which is configured to receive contact housing 66 of connector 62. Base 168 includes a plurality of support tabs 172a, 172b, 174a, 174b, and 176a, 176b which receive and position a PCA 178 having a plurality of contact pads 180 (disposed on an opposing face of PCA 178, as indicated by the dashed lines) configured to make contact with electrical contacts 96 of contact housing 66 when inserted into receptacle 64 via opening 170. PCA 178, via contact pads 180, is in electrical communication with electronic controller 46 and other electrical components of printer 32. Base 168 further includes a pair of contact stops 182a, 182b configured to stop vertical movement (i.e., along the z-axis in FIG. 8) of contact housing 66 when inserted into opening 170 so that contacts 96 of contact housing 66 align with contact pads 180 of PCA 178.

Figure 9:
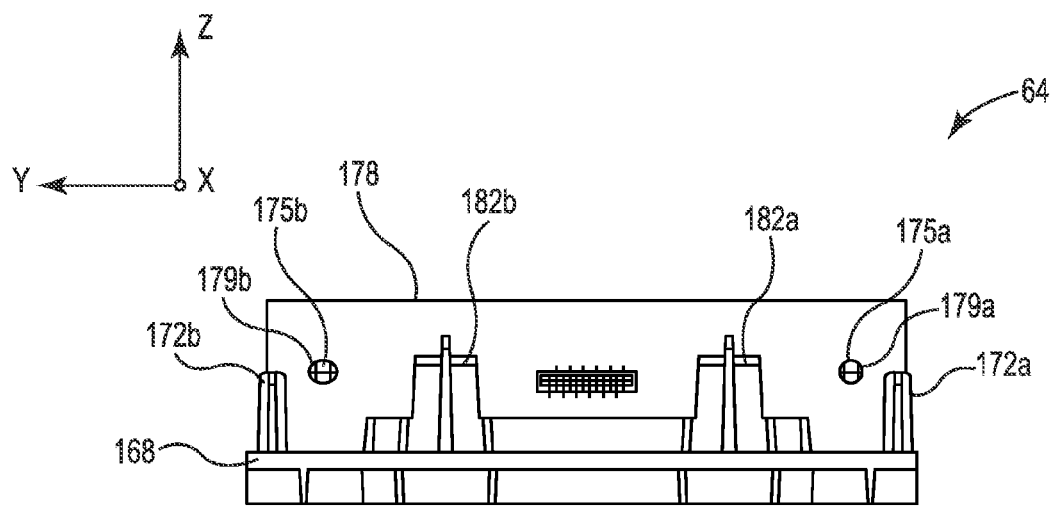
FIG. 9 is a side view illustrating the receptacle depicted in FIG. 8, according to one example.
Figure 10:
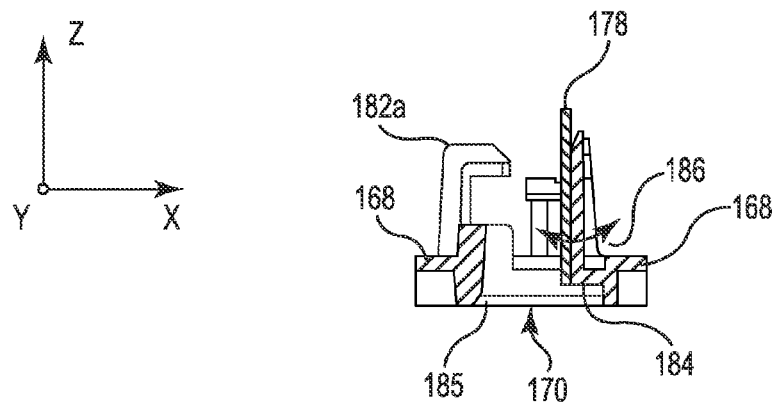
FIG. 10 is a cross-sectional view of the receptacle depicted in FIG. 8, according to one example.

FIG. 9 is a side view illustrating receptacle 64 depicted in FIG. 10. According to one example, support tabs 174a, 174b respectively include support pins 175a, 175b extending there from, with support pin 174a extending through a circular hole 179a and support pin 174b extending through an elliptical hole 179b in PCA 178. The combination of circular hole 179a and elliptical hole 179b eliminate movement of PCA 178 except for rotational movement in directions toward and away from electrical contacts 96 of contact housing 66 (i.e. about the y-axis) when inserted within opening 170.

FIG. 10 is a sectional view of receptacle 64, according to one example. As illustrated, in addition to contact stops 182a, 182b for stopping vertical movement (i.e., along the z-axis in FIG. 8) of contact housing 66 when properly aligned with and inserted into opening 170, receptacle 64 includes a door stop 184 at a mouth of opening 170. Door stop 184 is positioned to engage door 76 of connector 62 when properly aligned with receptacle 64 to push door 76 downward in the z-direction to expose electrical contacts 96 as contact housing 66 is being inserted into receptacle 64 so that electrical contacts 96 can make contact with contact pads 180 on PCA 178. According to one example, as illustrated, a mouth of opening 170 is tapered or angled, as indicated at 185, so as to guide contact housing 66 into opening 170. Also, as indicated by rotational arrow 186 illustrates that PCA 178 is rotatable about an axis extending substantially through support pins 175a, 175b. According to one example, PCA 178 can rotate up to approximately 3-degrees from vertical.

Figure 11:
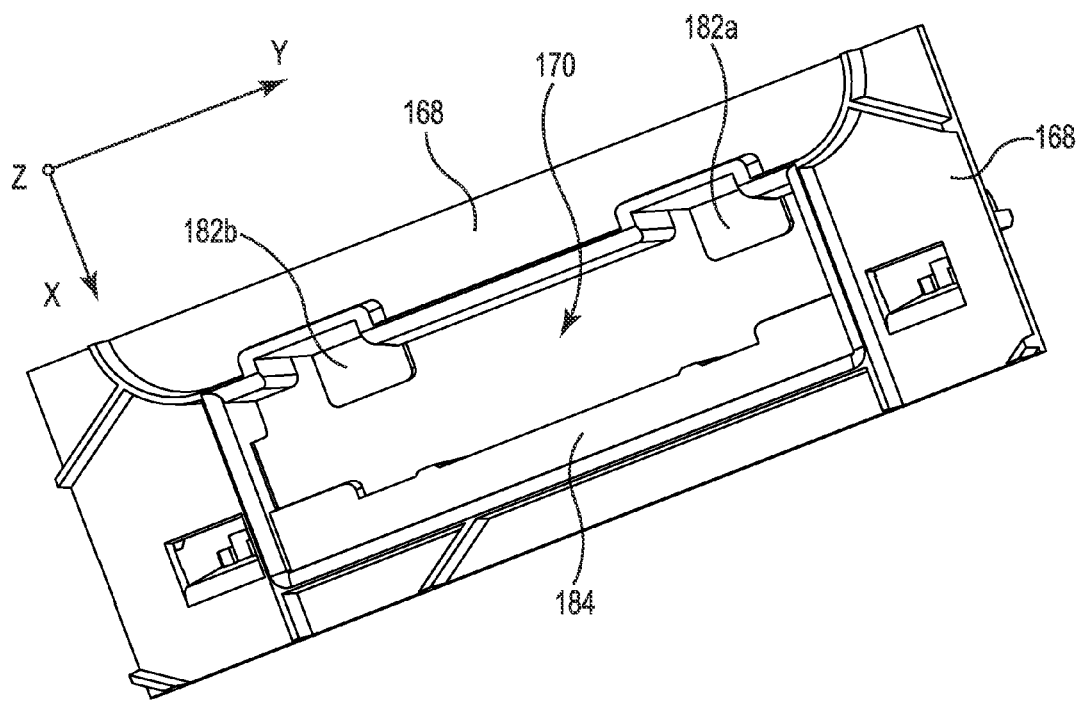
FIG. 11 is a perspective view illustrating a bottom of the receptacle depicted in FIG. 8, according to one example.

FIG. 11 is a perspective view of the bottom of receptacle 64, according to one example, illustrating opening 170 defined by base 168 in bottom surface 54 of housing 48 of printer 32.

According to one example, to connect printer 32 to accessory tray 50, printer 32 is positioned above and lowered onto accessory tray 50. When properly aligned, contact housing 66 of connector 62 of accessory tray 50 is configured to enter printer 32 via opening 170 of receptacle 64 so that electrical contacts 96 can make electrical contact with contact pads 180, thereby electrically connecting printer 32 to accessory tray 50.

Figure 12:
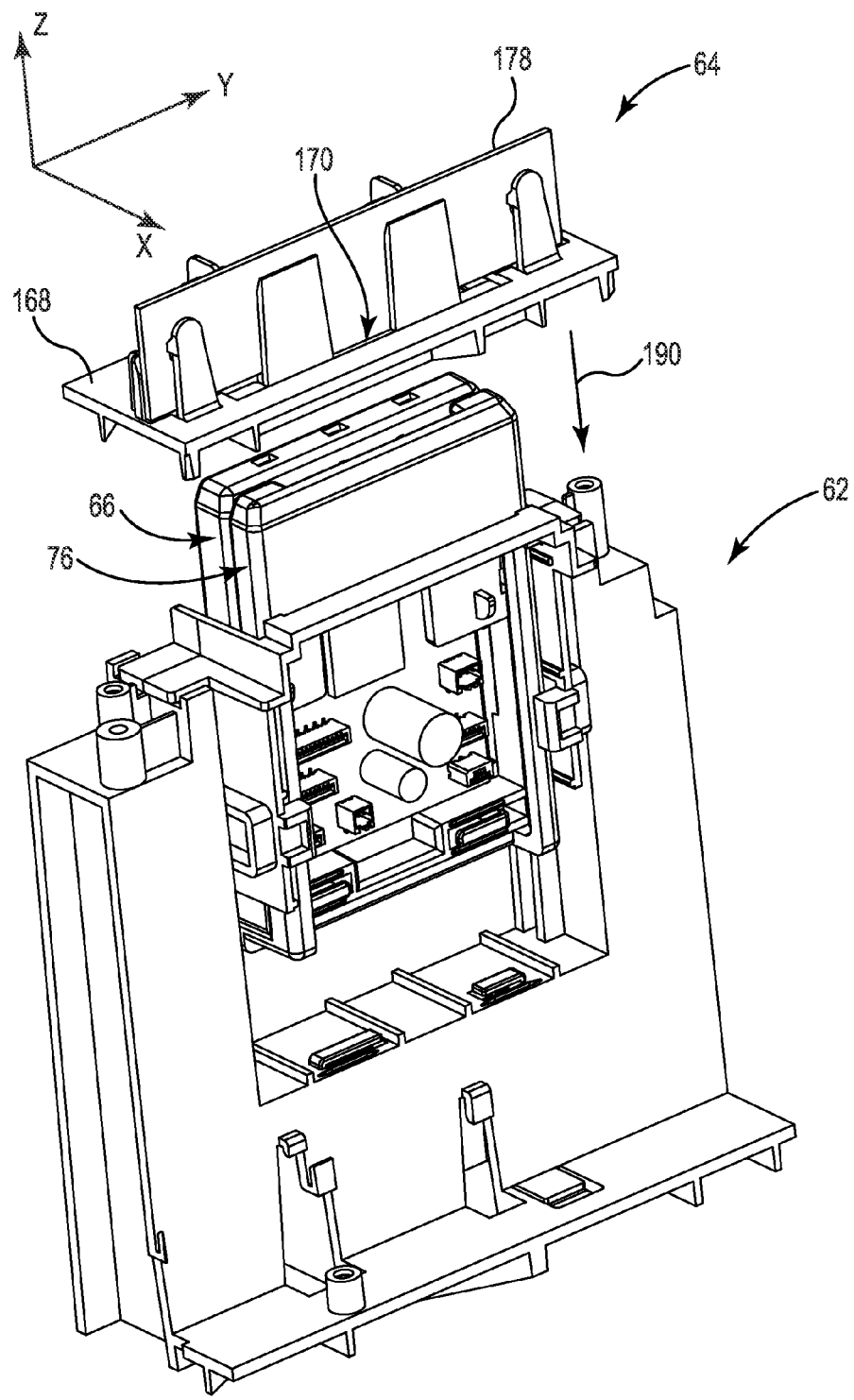
FIG. 12 is a perspective view of a connector system for connecting a printer to an accessory tray in a disengaged position, according to one example.

FIG. 12 is a perspective view generally illustrating receptacle 64 being lowered onto connector 62 (as indicated by directional arrow 190), such as when printer 32 is being lowered onto accessory tray 50 for electrical connection thereto.

Figure 13:
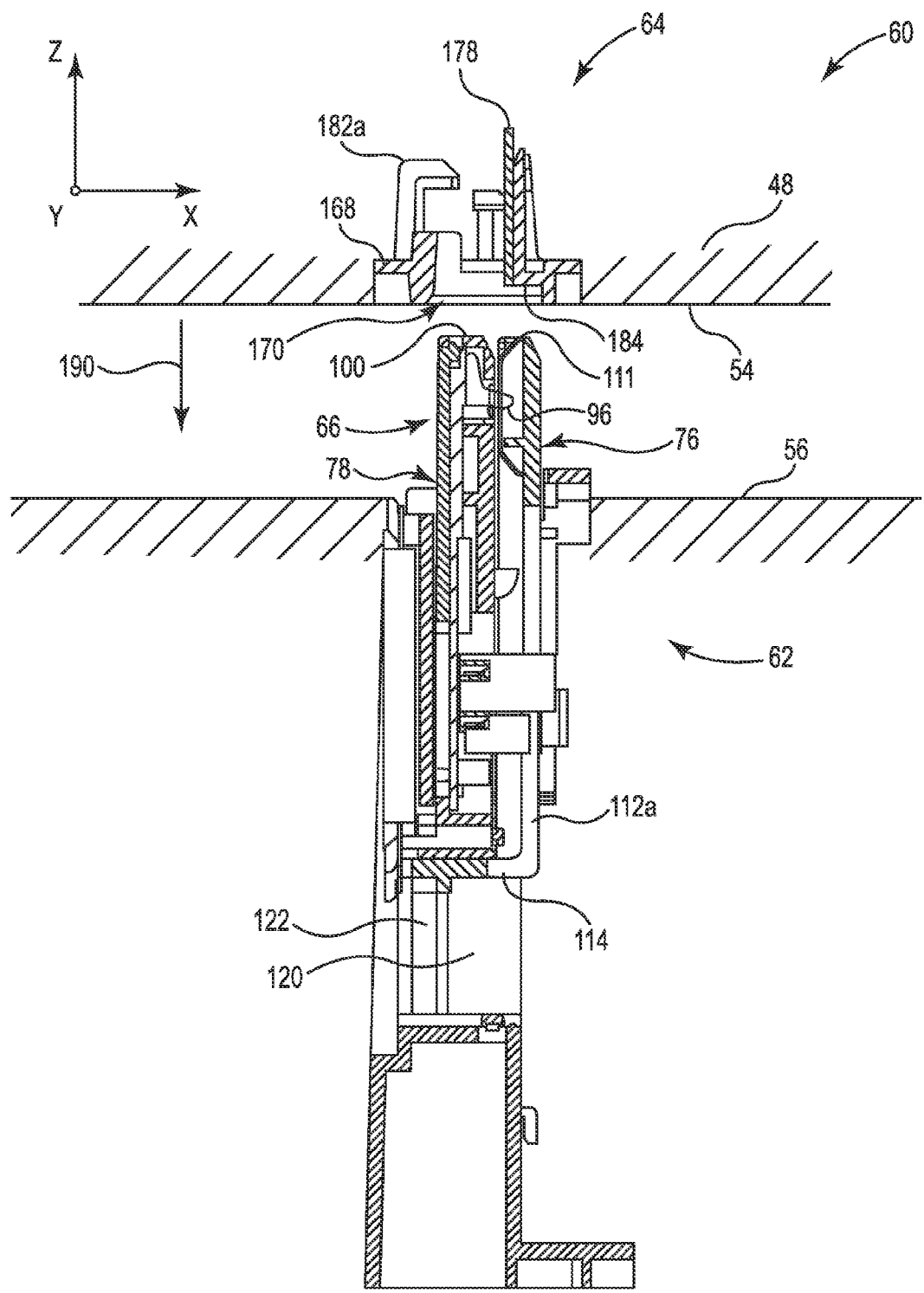
FIG. 13 is a cross-sectional view of the connector system depicted in FIG. 12, according to one example.

FIG. 13 is a sectional view through electrical connector system 60 depicted in perspective view in FIG. 12, and generally illustrates opening 170 of receptacle 64 in the bottom surface 54 of housing 48 of printer 32 being positioned above and lowered (as indicated by directional arrow 190) onto connector 62 in the top surface 56 of housing 52 of accessory tray 50. In FIG. 12, both contact housing 66 and door 76 are in an extended position from opening 78, with contact cover 110 of door 76 covering contact elements 96 extending from contact housing 66.

Figure 14:
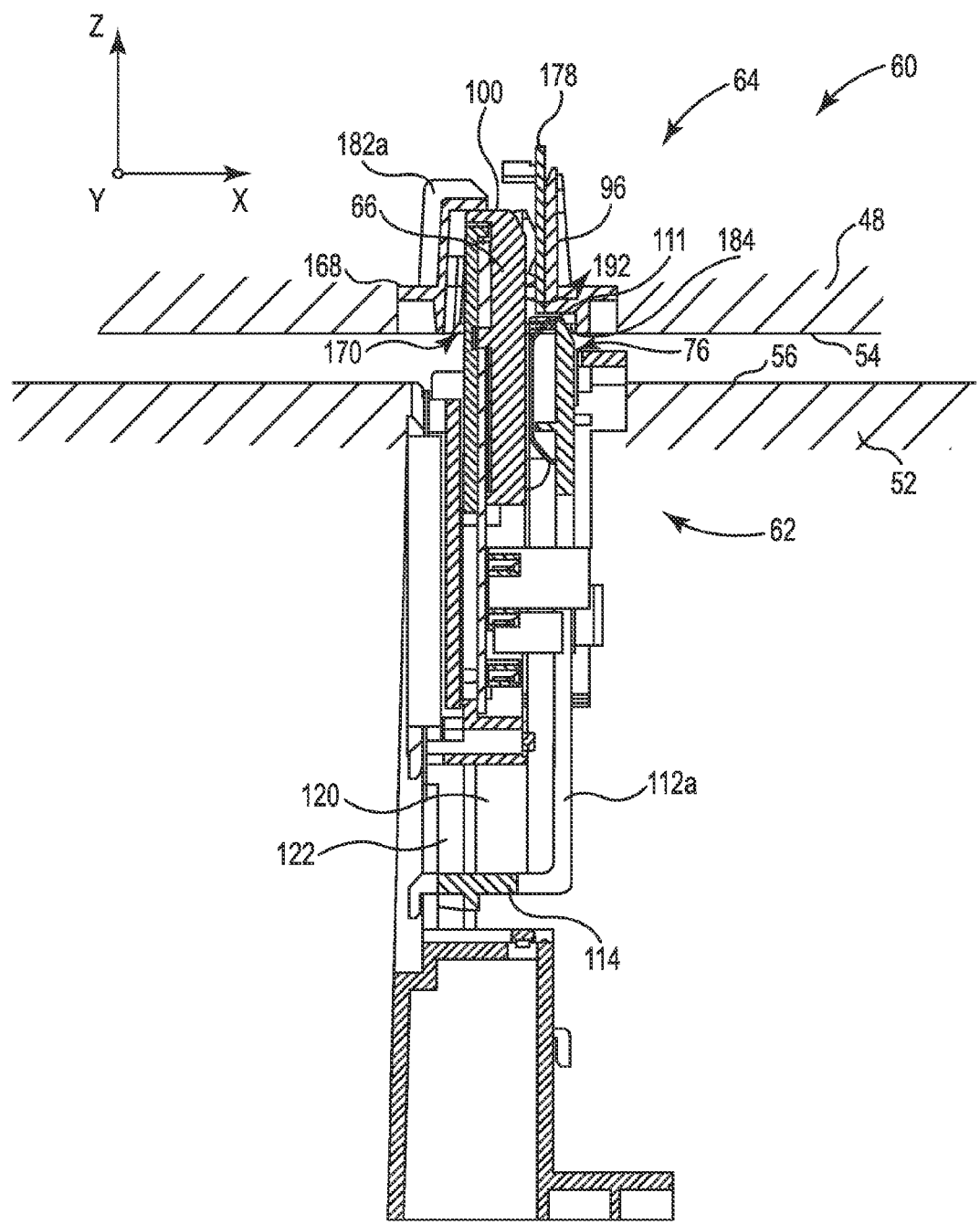
FIG. 14 is a cross-sectional view of the connector system depicted in FIG. 12 in an engaged position, according to one example.

FIG. 14 represents the sectional view of FIG. 13 after opening 170 of receptacle 64 in the bottom surface 54 of housing 48 of printer 32 has been properly aligned with and lowered onto contact housing 66 of connector 62 in the top surface 56 of housing 52 of accessory tray 50. In the connected position, as illustrated by FIG. 14, door stop 184 of receptacle 64 engages top edge 111 of door 76, and pushes door 76 down through opening 78 of connector 62 and into base cavity 120 in accessory tray 50. Pushing down door 76 in this fashion exposes electrical contacts 96 on contact housing 66 as contact housing 66 slides and extends into opening 170 in receptacle 64 until top edge 110 engages contact stops 182a, 182b.

Contact stops 182a, 182b position contact housing 66 within opening 170 of receptacle 64 so that electrical contacts 96 of contact housing 66 are aligned with and contact corresponding contact pads 180 on PCA 178 of receptacle 64, thereby electrically connecting accessory tray 50 with printer 32. As mentioned above, electrical contacts 96 are biased so as to extend from major surface 98 of contact housing 66 toward contact cover 110 of door 76 (see FIG. 5). When properly aligned, as receptacle 64 is lowered toward connector 62, contact housing 66 slides into opening 170 and door 76 is pushed down, and electrical contacts 96 come into physical contact with PCA 178 of receptacle 64. As a result, electrical contacts 96 are pushed partially into contact housing 66 and PCA 178 is rotationally biased about the y-axis as PCA 178 is pushed by electrical contacts 96, as indicated by rotational arrow 192. This rotational movement of PCA 178 reduces the normal forces between electrical contacts 96 and PCA 178, and contact pads 180 thereon, as contact housing 66 is slid into opening 170 and reaches contact stops 182a, 182b. Upon reaching the installed position, with top edge 110 of contact housing 66 engaging contact stops 182a, 182b, electrical contacts 96 are aligned with and biased against corresponding contact pads 180 on PCA 178, thereby electrically connecting accessory tray 50 with printer 32.

If opening 170 of receptacle 64 is not properly aligned with contact housing 66 of connector 62, either top edge 100 of contact housing 66 or top edge 111 of door 76, or both, come into contact with bottom surface 54 of housing 48 of printer 32, thereby causing both contact housing 66 and door 76 to be pushed downward through opening 78 of connector frame 80 and into base cavity 120. This position is illustrated by FIG. 6.

By pushing both contact housing 66 and door 76 into cavity 120 via opening 78 in connector frame 80 when any misalignment occurs, potential damage to both connector 62, receptacle 64, as well as to other parts of printer 32 and accessory tray 50 is prevented. Also, moving door 76 along with contact housing 66 protects electrical contacts 96 from physical damage and also prevents electrical contacts 96 from contacting potential sources of damaging ESD that might otherwise discharge into the internal electrical components of via electrical contacts 96.

Although described herein primarily in terms of accessory tray 50, electrical connector system 60, including connector 62 and receptacle 64, can be adapted for electrically connecting other accessories (e.g. output collator/sorter) to printer 32. For such other accessories, printer 32 may not be placed on top of the accessory, but the connector 62 and receptacle 64 may be disposed on surfaces other than a top surface of the accessory and a bottom surface of printer 32.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A printer accessory comprising:
a housing; and
a connector including:
a frame defining an opening in the housing;
a contact housing having electrical contacts and a door which are slideably disposed within the opening; and
biasing elements which bias the contact housing and the door to extend together from the opening with the door covering the electrical contacts, wherein the door is configured to be depressed into the housing through the opening independently of the contact housing to expose the electrical contacts on the contact housing.

2. The printer accessory of claim 1, wherein the accessory comprises an accessory tray.

3. The printer accessory of claim 1, wherein the door includes an interlock element which is engaged by the contact housing when the contact housing is pushed through the opening and into the housing so that the contact housing and the door are pushed together into the housing.

4. The printer accessory of claim 1, wherein the biasing elements comprise resilient elements.

5. The printer accessory of claim 1, wherein at least one resilient element is coupled between the frame and the contact housing, and at least one resilient element is coupled between the frame and the door.

6. The printer accessory of claim 1, wherein the electrical contacts are in electrical communication with electrical components of the accessory.

7. The printer accessory of claim 1, wherein the electrical contacts are biased so as to extend from a major surface of the contact housing facing the door.

8. The printer accessory of claim 1, wherein the electrical contacts are configured to be depressed into the contact housing.

9. The printer accessory of claim 1, wherein the frame, together with the contact housing and the door, has a range of movement in directions parallel to the housing surface.

10. The printer accessory of claim 1, wherein range of movement is 2 millimeters along a first axis parallel to the housing surface and 2 millimeters along a second axis parallel to the housing surface, the second axis being orthogonal to the first axis.

11. A printer comprising:

a housing having a surface;

a receptacle including:

a base defining an opening in the housing surface; and electrical contact pads positioned adjacent to the opening and arranged to be substantially orthogonal to the housing surface and to rotate from the orthogonal away from corresponding electrical contacts as the corresponding electrical contacts are received into the opening and slide along and push against the corresponding electrical contact pads so as to reduce normal forces between the electrical contacts and the electrical contact pads, the electrical contacts to connect to a printer accessory that expands the normal operation of the printer.

12. The printer of claim 11, wherein the receptacle includes at least one contact stop that limits how far the contact housing can extend into the receptacle through the opening so as to align the electrical contacts with the contact pads.

13. The printer of claim 11, wherein the contact pads can rotate from orthogonal away from the electrical contacts by up to 3 degrees.

14. The printer of claim 11, wherein the contact pads are in electrical communication with electrical components of the printer.

15. A printing system comprising:

a printer including:

a printer housing; and a receptacle defining an opening in the printer housing and having contact pads disposed adjacent to the opening; and an accessory including:

an accessory housing; and a connector including:

a frame defining an opening in the accessory housing;

a contact housing and a door each slideably disposed within the opening, the contact housing having electrical contacts facing the door; and biasing elements which bias the contact housing and the door to extend together from the opening with the door covering the electrical contacts, wherein the door is configured to be depressed into the accessory housing by the printer to expose the electrical contacts when the opening of the receptacle is aligned with the contact housing when the accessory is mated with the printer so that the contact housing extending into the opening of the receptacle and the electrical contacts make electrical connection with the contact pads.

16. The printing system of claim 15, wherein the contact housing and the door are configured to be pushed in unison through the frame opening into the accessory housing when the opening of the receptacle is misaligned with the contact housing.

17. The printing system of claim 15, wherein the door includes an interlock element which is engaged by the contact housing when the contact housing is pushed through the frame opening and into the housing so that the contact housing and the door are pushed together into the housing.

18. The printing system of claim 15, wherein the connector includes at least one contact stop that limits extension of the contact housing into the receptacle through the receptacle opening so as to align the electrical contacts with the contact pads.

19. The printing system of claim 15, wherein the accessory is an accessory tray, wherein the receptacle defines the opening in a bottom surface of the printer housing, and wherein the frame defines the opening in a top surface of the accessory housing.

20. The printing system of claim 15, wherein the contact pads are arranged to be substantially orthogonal to the receptacle opening and are configured to rotate from the orthogonal away from the electrical contacts as the electrical contacts are received into the receptacle opening and slide along and push against the corresponding contact pads so as to reduce normal forces between the electrical contacts and the contact pads.

\* \* \* \* \*